(12) United States Patent
Zhang et al.

(10) Patent No.: US 7,921,034 B2
(45) Date of Patent: Apr. 5, 2011

(54) ADVERTISEMENT PLATFORM, SYSTEM FOR PLAYING ADVERTISEMENT AND METHOD THEREOF

(75) Inventors: Deqiang Zhang, Guangdong (CN);
Xiangdong Wang, Guangdong (CN);
Haifeng Cui, Guangdong (CN);
Zhengjun Zhang, Guangdong (CN);
Chonghui Huang, Guangdong (CN);
Xiaoyi Dong, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 733 days.

(21) Appl. No.: 11/568,853

(22) PCT Filed: May 15, 2006

(86) PCT No.: PCT/CN2006/000970
§ 371 (c)(1),
(2), (4) Date: Nov. 8, 2007

(87) PCT Pub. No.: WO2006/119711
PCT Pub. Date: Nov. 16, 2006

(65) Prior Publication Data
US 2008/0300969 A1 Dec. 4, 2008

(51) Int. Cl.
*G06Q 40/00* (2006.01)
(52) U.S. Cl. .......................................... 705/14; 705/35
(58) Field of Classification Search .................. 705/14, 705/35
See application file for complete search history.

(56) References Cited

U.S. PATENT DOCUMENTS

2006/0109969 A1* 5/2006 Oh ............................ 379/207.16
2007/0116251 A1* 5/2007 Seo ................................. 379/372

FOREIGN PATENT DOCUMENTS

| CN | 1294811 | 5/2001 |
| CN | 1523904 | 8/2004 |
| CN | 1540901 | 10/2004 |
| WO | WO-2004/056140 | 7/2004 |
| WO | WO-2005/009015 | 1/2005 |

OTHER PUBLICATIONS

Chinese Office Action for Application No. 100518218C, dated Jul. 22, 2009. (Abstract Only).
International Preliminary Report on Patentability for Application No. PCT/CN2006/000970, dated Aug. 11, 2006.

* cited by examiner

*Primary Examiner* — Thu Thao Havan

(57) ABSTRACT

The present invention discloses an Advertisement Platform (ADP), including an ADP Switch Point (ADP-SP), a voice playing unit and a service logic supporting unit; wherein the ADP-SP connects a call from a calling LS or an MS and initiates an advertisement service call to the service logic supporting unit; upon receiving the advertisement service call from the ADP-SP, the service logic supporting unit returns advertisement service instruction to the ADP-SP after parsing the advertisement service call; upon receiving the advertisement service instruction returned by the service logic supporting unit, the ADP-SP instructs the voice playing unit to play a ring back tone which includes advertisement according to the advertisement service instruction and connects a voice channel used for the voice playing unit playing advertisement with the calling voice channel or the MS voice channel. The present invention also discloses a system and method for playing advertisement.

18 Claims, 3 Drawing Sheets

ADVERTISEMENT PLATFORM, SYSTEM FOR PLAYING ADVERTISEMENT AND METHOD THEREOF

CROSS REFERENCES TO RELATED APPLICATIONS

This application is the national phase of International Application No. PCT/CN2006/000970, which was filed on May 15, 2006, and which, in turn, claimed the benefit of Chinese Patent Application No. 200510069294.4, which was filed on May 13, 2005, the entire disclosures of which are hereby incorporated by reference.

FIELD OF THE TECHNOLOGY

The present invention relates to communication techniques, and more specifically, to an advertisement platform, a system for playing advertisement and a method thereof.

BACKGROUND OF THE INVENTION

Communication industry, as a public service industry, has some advantages in reaching the public over conventional industries like broadcast, television and transportation. For example, the communication network has wider coverage and much more users. Communication network operators, however, have not made full use of these advantages to provide effective advertisement platforms for businessmen to put their business advertisements or for commonweal promotion.

Therefore, communication network operators put forward a telephone service providing market information in voice advertisement which enables advantages of the communication network to be fully used in providing effective advertisement platforms for businessmen and promoting commonweal. Through the advertisement platform, businessmen could provide network based advertisement service, which will increase the benefits of the operator of the communication network.

According to regulations of market-information telephone service, the procedure of market-information telephone service in the prior art includes the following steps: the operator designates a special telephone number for advertisement access; subscribers listen to advertisement messages which are played by the communication system by dialing the special telephone number for advertisement access, and there are several ways to play advertisement, such as the rotation mode and the random mode.

SUMMARY OF THE INVENTION

The present invention provides an Advertisement Platform (ADP), a system for playing advertisement and a method thereof.

An Advertisement Platform (ADP) comprises:
an ADP switch point (ADP-SP), connecting a call from a calling local switch (LS) or a tandem switch (MS); initiating an advertisement service call to a service logic supporting unit; upon receiving an advertisement service instruction returned by the service logic supporting unit, instructing a voice playing unit to play a ring back tone which includes an advertisement according to the advertisement service instruction; and connecting a voice channel used for the voice playing unit playing the advertisement with the calling voice channel or the MS voice channel;

a voice playing unit, playing the ring back tone which includes the advertisement according to the advertisement service instruction;

a service logic supporting unit, receiving the advertisement service call from the ADP-SP, and returning the advertisement service instruction to the ADP-SP after parsing the advertisement service call.

A system for playing advertisement comprises a calling terminal, a calling local switch (LS), a called terminal, a called LS and an Advertisement Platform (ADP);

wherein the calling LS receives a call from the calling terminal to the called terminal and routes the call to the ADP; the ADP routes the call to the called LS and plays a ring back tone which includes an advertisement to the calling terminal through the calling LS when the state of the called terminal returned by the called LS is a preset advertisement playing state.

A method for playing advertisement comprises:
receiving a call from a calling terminal and routing the call to an Advertisement Platform (ADP) by a calling local switch (LS);

routing the call to a called LS by the ADP, and returning to the ADP state of called terminal by the called LS;

playing a ring back tone which includes advertisement to the calling terminal by the ADP if the state of the called terminal is a preset advertisement playing state.

A system for playing advertisement comprises a calling terminal, a calling local switch (LS), a called terminal, a called LS, a Service Control Point (SCP) of Intelligent Network (IN), a Service Switch Point (SSP) of IN and an Advertisement Platform (ADP);

wherein the calling LS receives a call from the calling terminal to the called terminal and routes the call to the SSP; the SSP triggers an advertisement service in the SCP; the SCP returns an ADP route code to the SSP; the SSP routes the call to the called IRS; the called LS returns the state of the called terminal to the SSP; the SSP instructs the ADP to play a ring back tone which includes advertisement via the SSP and the calling LS in turn.

A method for playing advertisement comprises:
receiving a call from a calling terminal and routing the call to a Service Switch Point (SSP) by a calling local switch (LS); triggering an advertisement service in a Service Control Point (SCP) by the SSP; returning an Advertisement Platform (ADP) route code to the SSP by the SCP;

routing the call to a called LS, and returning to the SSP the state of the called terminal by the called LS;

playing a ring back tone which includes advertisement to the calling terminal by the SSP if the state of called terminal is the preset advertisement playing state.

As can be seem from the above mentioned technical scheme, an advertisement platform (ADP) is added to the existing communication network, and after receiving a call from the calling party and detecting that the calling party has subscribed to the advertisement service, the calling LS triggers the call to the ADP directly or indirectly; the ADP selects advertisement voice file stored in itself and plays the advertisement to the calling party if detecting that the ring back tone played by the called LS to the calling party is ringing tone. By the present invention, the cost of implementing advertisement service is lowered since it is only needed to add an ADP to the existing communication network and there is no need to upgrade or modify the equipment or entities in the existing communication network. At the same time, there is no need to allocate special access number in the method of the present invention, which saves the resources of access number, therefore the cost of implementing the service is further lowered.

BRIEF DESCRIPTION OF THE DRAWINGS

FIG. 3 is a flow chart illustrating advertisement playing by the system of FIG. 2a.

EMBODIMENTS OF THE INVENTION

The present invention is hereinafter described in detail with reference to the accompanying drawings and embodiments so that the solution and merits thereof could be more apparent.

According to an embodiment of the present invention, an ADP which includes an ADP switch point (ADP-SP), a voice playing unit and a service logic supporting unit is provided. The ADP-SP receives a call from a calling LS or a MS and initiates an advertisement service call to the service logic supporting unit; the service logic supporting unit receives the advertisement service call from the ADP-SP and returns advertisement service instructions to the ADP-SP after analyzing the advertisement service call; upon receiving the advertisement instructions returned from the service logic supporting unit, the ADP-SP instructs the voice playing unit to play the ring back tone according to the instructions and connects the voice channel which is used for voice playing unit to play advertisement with the calling voice channel or the MS voice channel.

Figure 1:
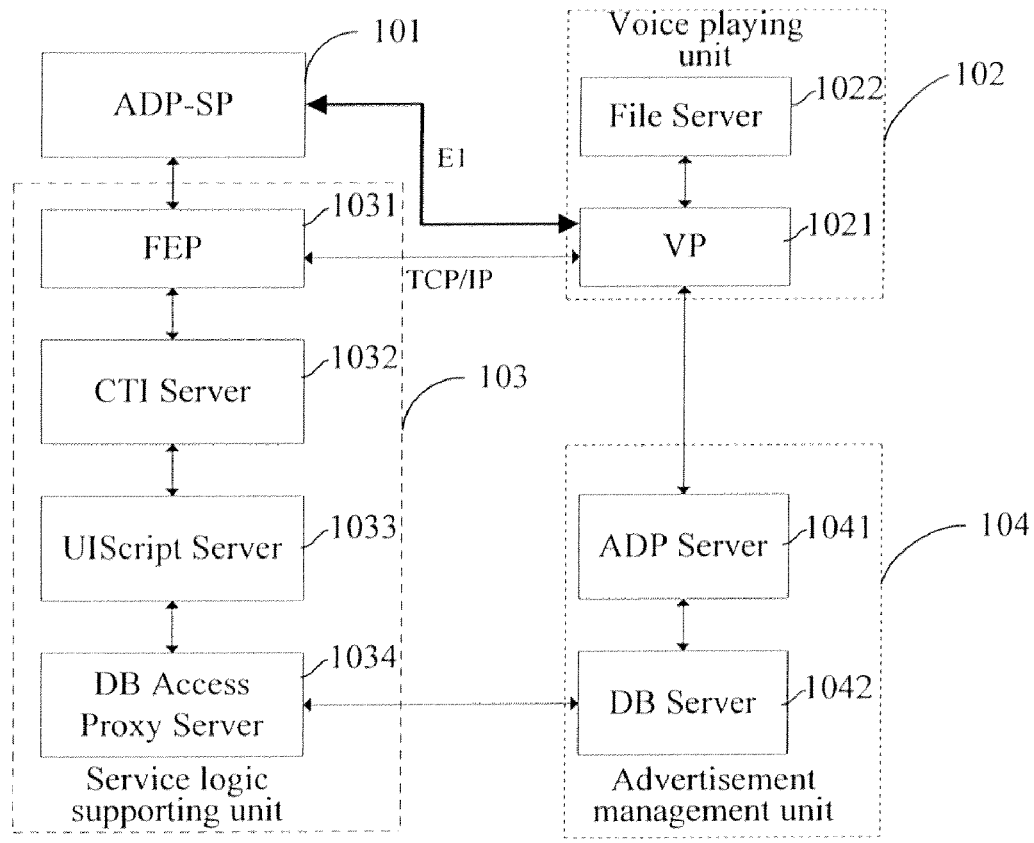
FIG. 1 is a schematic diagram illustrating the structure of the advertisement platform (ADP) in accordance with an embodiment of the present invention.

FIG. 1 shows a structure of the ADP added to an existing communication network in accordance with an embodiment of the present invention. As shown in FIG. 17 the ADP includes an ADP switch point (ADP-SP) 101, a voice playing unit 102, a service logic supporting unit 103 and an advertisement management unit 104.

The ADP-SP 101 is used for connecting a call from the calling LS or the MS to the ADP and allocating the voice resource in the voice playing unit 102 to play advertisement voices. The ADP-SP 101 has the elementary functions of a switch, including elementary Accounting Management (AM)/Call Management (CM)/Session Management (SM) module. E1 interface is adopted for the connection between the ADP-SP 101 and the voice playing unit 102 to establish the voice channel between the voice playing unit 102 and an external switch. Here, E1 interface is adopted with a view of obtaining real-time voice and ensuring high voice quality.

The voice playing unit 102 mainly includes one or more Voice Peripheral (VP) 1021 and a File Server 1022. The VP 1021 plays the designated advertisement voice according to the advertisement playing instructions from the ADP-SP 101. The File Server 1022 is used to store advertisement voice files. Advertisement voice files can be stored in a memory of the VP 1021, and when the space of the memory is not enough, advertisement voice files can also be stored in the File Server 1022. Obviously, advertisement voice files can also be stored directly in the File Server 1022. The E1 interface connection between the ADP-SP 101 and the voice playing unit 102 is implemented by the E1 interface connection between the ADP-SP 101 and the VP 1021. The voice channel between the voice playing unit 102 and external switch is usually called VP channel.

As the voice playing device of the ADP, the VP 1021 provides some functions such as voice playing, recording, and number receiving. The VP 1021 works in a load distribution manner. That is, if one VP 1021 and one VP channel is in trouble, other VPs and other VP channels may not be affected and may be used normally. Here, the VP 1021 adopts trouble-handling mechanism of n+1 backup mode which is generally used at present.

The service logic supporting unit 103 mainly includes a Front End Processor (FEP) 1031, a Computer Telephone Integrated Server (CTI Server) 1032, at least one User Interaction Script Server (UIScript Server) 1033 and a Database Access Proxy Server (DB Access Proxy Server) 1034. The function of each entity is as follows respectively:

The FEP 1031 implements message forwarding and storage between the ADP-SP 101 and the CTI Server 1032 as well as between the ADP-SP 101 and the VP 1021. Every signal is transferred by using TCP/IP.

The CTI Server 1032 is mainly used to process a call from the FEP 1031, distribute the call to the corresponding UIScript Server 1033 according to a configured ratio, and forward to the ADP-SP 101 through the FEP 1031 the result which is obtained by the UIScript Server 1033 implementing the service logic script.

The UIScript Server 1033 parses the script according to the call from the CTI Server 1032, implements the corresponding service logic script, and requests the DB Access Proxy Server 1034 for relative advertisement code data according to contents of the script. Upon obtaining the advertisement code data returned by the DB Access Proxy Server 1034, the UIScript Server 1033 transmits to the CTI Server 1032 the result which is obtained by the UIScript Server 1033 implementing service logic script. The advertisement code data is the name of advertisement voice file which is stored in the voice playing unit 102. The result which is obtained by the UIScript Server 1033 implementing service logic script is included in the advertisement code data. One FEP 1031/CTI Server 1032 matches N UIScript Servers 1033, therefore, the CTI Server 1032 will distribute a call to a certain UIScript Server 1033 according to distribution ratio after it receives the message transmitted by the FEP 1031. The UIScript Server 1033 stores pre-set service logic scripts which are usually written by Voice Extensible Markup Language (VXML) or Global Service Logic (GSL). The UIScript Server 1033 will parse the service logic script and send the corresponding result to the ADP-SP 101 according to requirements of the service logic script. The UIScript Server 1033 may also access the database to obtain the required information through the DB Access Proxy Server 1034.

The DB Access Proxy Server 1034 is used to obtain advertisement code data through accessing database according to the requests from the UIScript Server 1033, and return the obtained advertisement code data to the UIScript Server 1033. The DB Access Proxy Server 1034, similar to the middleware in the three level architecture of database, is in charge of accessing database during the service besides storing user data. Specifically, the service logic implemented in the UIScript Server 1033 is application level service logic while the service logic implemented in database is database logic, and the middleware is used to encapsulate the application level request, change the request into the access format which is supported by database, maintain the database connection, and establish the database connection resource pool, thereby improving the efficiency of database access.

The advertisement management unit 104 mainly includes an ADP Server 1041 and a database server (DB Server) 1042. The function of each entity is as follows respectively:

The ADP Server 1041 is used to implement management and maintenance of the advertisement service. A businessmen can upload or adjust advertisement voices through a management interface provided by the ADP Server 1041 by himself or by consigning to the operator and can set or modify the regulations of playing advertisement voices after obtaining the approval from the operator. The regulations of playing advertisement voice include: the ADP, according to the information of different calling numbers, different called numbers, different time intervals, different data or different holidays etc, playing one designated advertisement voice group or single advertisement voice, or playing several advertisement voice groups or several advertisement voices in rotation. Thus the way of playing advertisement voice is very flexible. The ADP Server 1041 stores the uploaded advertisement voice files in the voice playing unit 102.

The DB Server 1042 is mainly used to store data information which is mainly the advertisement code data uploaded by businessmen and the information generated by setting or modifying the regulations of playing advertisement voice. As mentioned above, the advertisement code data indicate the advertisement voice file which is stored in the voice playing unit 102. This information is obtained by the DB Access Proxy Server 1034 and then transmitted to the UIScript Server 1033.

An example is hereinafter described briefly to illustrate how the entities of the ADP work together:

The ADP-SP 101 connects a call initiated by a certain calling LS, suspends the call and initiates an internal protocol call, namely an advertisement service call, to the CTI Server 1032 through the FEP 1031. The CTI Server 1032 determines a processing method according to the call properties after the call reaches the CTI Server 1032, sends the call to the corresponding UIScript Server 1033 to be processed. The UIScript Server 1033 starts up different service logics to process the call according to the call properties and requests the DB Access Proxy Server 1034 for the advertisement code data requested by the service logic scripts. The DB Access Proxy Server 1034 obtains the advertisement code data of the service logic scripts by accessing database, and returns the advertisement code data to the UIScript Server 1033. The UIScript Server 1033 returns an instruction containing the result of implementing the service logic scripts to the ADP-SP 101 through the CTI Server 1032, implements subsequent processing of the call, and plays advertisement voices to the calling party until the line is disconnected.

Under the circumstances without voice channel alternating, the ADP-SP 101 allocates a corresponding VP 1021 according to the advertisement playing request returned by the service logic supporting unit 103, and connects the VP 1021 with the voice channel of the calling MS such that the calling party can hear the advertisement voice played by the VP 1021.

Under the circumstances with voice channel alternating, the ADP-SP 101 is in charge of not only allocating a corresponding VP 1021, but also routing the call to the called party according to the service logic request returned by the service logic supporting unit 103 so as to implement a proper connection of the calling voice channel, the VP channel and the called voice channel, i.e., connecting the VP channel with the calling voice channel during the ringing stage at the called side to make the calling party hear the advertisement voice played by the VP 1021 while connecting the called voice channel with the calling voice channel upon detecting the off-hook of the called party to make the calling party communicate with the called party.

When an ADP is added to an existing communication network, it can be added to a fixed telephone network or a mobile communication network, or added to a fixed telephone network combined with Intelligent Network (IN) or a mobile communication network combined with IN. Typically, a fixed telephone network is the Public Switched Telephone Network (PSTN), and a mobile communication network is a communication network of Global System for Mobile Communications (GSM), Wideband Code Division Multiple Access (WCDMA) or Code Division Multiple Access (CDMA), etc.

Figure 2A:
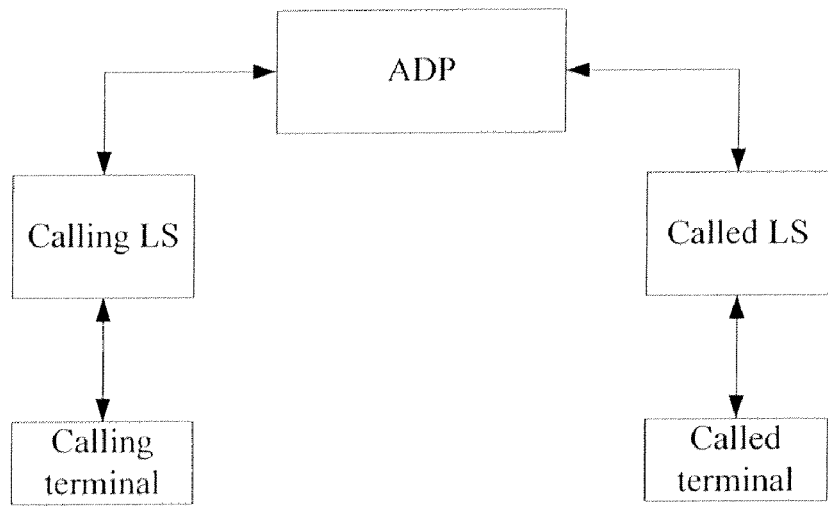
FIG. 2a is a schematic diagram illustrating the structure of a system for playing advertisement including the ADP of FIG. 1 in accordance with an embodiment of the present invention.

FIG. 2*a* is a schematic diagram of the structure of a system for playing advertisement in accordance with an embodiment of the present invention, where the ADP is added to an existing fixed telephone network. As can be seen from FIG. 2*a*, the system for playing advertisement includes a calling terminal, a calling LS, a called terminal, a called LS and an ADP.

The calling terminal connects with the ADP through the calling LS, and the called terminal connects with the ADP through the called LS. The ADP receives the call from the calling LS and sends the call to the called LS. The ADP receives the state of the called terminal returned by the called LS, and if the state of the called LS is the preset advertisement playing state, the ADP plays the ring back tone including advertisement for the calling terminal.

In the network shown in FIG. 2*a*, there is an alternative voice channel in the ADP. The functions of the ADP are playing advertisement, connecting the voice channel for playing advertisement with the calling voice channel, routing the call to the called terminal, connecting the voice channel for playing advertisement with the calling voice channel or connecting the called voice channel with the calling voice channel according to the state of the called terminal.

Figure 2B:
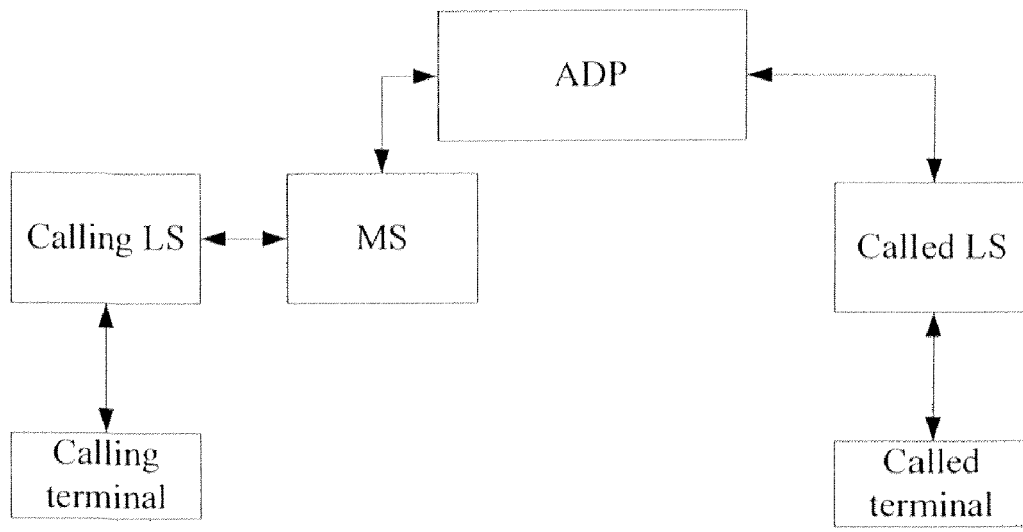
FIG. 2b is a schematic diagram illustrating the structure of another system for playing advertisement including the ADP of FIG. 1 in accordance with an embodiment of the present invention.

FIG. 2*b* is a schematic diagram of the structure of another system for playing advertisement in accordance with an embodiment of the present invention, where the ADP is added to an existing fixed telephone network. As can be seen from FIG. 2*b*, the system for playing advertisement includes a calling terminal, a calling LS, a called terminal, a called LS, an MS and an ADP. The only difference between the system shown in FIG. 2*b* and the system shown in FIG. 2*a* is that there is an MS between the called LS and the ADP. The function of each entity is the same as that of the corresponding entity shown in FIG. 2*a*, so there is no more description.

In the network shown in FIG. 2*b*, there is voice channel alternating in the ADP. The functions of the ADP are playing advertisement, routing the call to the called terminal and connecting the voice channel for playing advertisement with the MS voice channel or connecting the called voice channel with the MS voice channel according to the state of the called terminal.

To implement the function of playing advertisement through the ring back tone, a user needs to subscribe to the advertisement service in advance to become an advertisement service member in the LS to which the user belongs. After the user becomes an advertisement service member, the database of the LS to which the user belongs will store the user's number which has an identity of advertisement service member. The LAS, upon receiving a call from the user, decides whether the user has subscribed to the advertisement service through deciding whether the calling number has the identity of advertisement service member.

Figure 3:
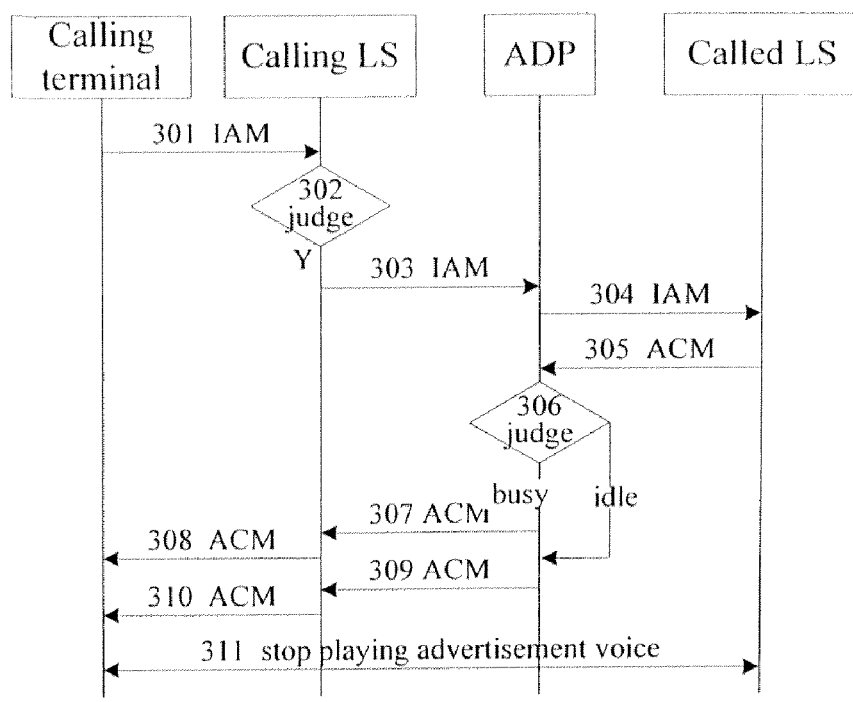

FIG. 3 is the flow chart of playing advertisement based on the system shown in FIG. 2a. In this embodiment, the calling party and the called party are fixed telephone users, and the calling party has subscribe to the advertisement service and become an advertisement service member in the calling LS. As can be seen from FIG. 3, this embodiment mainly comprises the steps of:

Step 301: A calling party initiates a call and sends an Initial Address Message (JAM) which at least includes a calling number and a called number to a calling LS.

Step 302: The calling LS receives the IAM, decides whether the calling number has an identity of advertisement service member, if so, the calling LS adds the ADP route code into the IAM and proceeds to Step 303 since the calling party is an advertisement service member, otherwise, performs normal call routing procedure.

Step 303: The calling LS routes the call to the ADP according the ADP route code, and triggers the advertisement service in the ADP. The IAM at least includes the calling number, the ADP route code and the called number. Specifically, the ADP-SP connects the call and transmits the call to the FEP/CTI Server; the CTI Server transmits the call to a certain UIScript Server according to properties of the call so as to trigger a certain advertisement service procedure.

Step 304: The ADP, upon receiving the IAM, extracts the ADP route code from the IAM, transmits an IAM which at least carries the calling number and the called number to the called LS according to the called number, and routes the call to the called LS. Specifically, the number parsing regulation is stored in a VXML file or a Global Service Logic (GSL) file and is implemented by the UIScript Server in the ADP; the UIScript Server instructs the ADP-SP to route the call to the called LS according to the called number; the UIScript Server and the ADP-SP exchange messages via the FEP/CTI Server.

Step 305: The called LS, upon receiving the IAM, inquires the state of the called terminal according to the called number carried by the IAM, returns an Address Complete Message (ACM) which carries the state of the called terminal to the ADP, establishes a voice channel between the called LS and the ADP, selects a ring back tone corresponding to the state of the called terminal from all ring back tones stored in its voice memory and plays the selected ring back tone through the established voice channel, The ring back tone is the voice which is selected by the called LS from its voice memory according to the state of the called terminal after obtaining the state of the called terminal according to the received called number. If the called terminal is busy, the returned ring back tone is the busy tone, and if the called terminal is idle, the ring back tone is the ringing tone which means waiting for an answer from the called party.

Step 306: The ADP, upon receiving the ACM, detects the state of the called terminal according to the ACM, and if the called terminal is busy, proceeds to Step 307; if the called terminal is idle, proceeds to Step 309.

Steps 307-308: The ADP returns an ACM to the calling terminal via the calling LS, transmits transparently to the calling terminal the busy tone returned by the called LS and corresponding to the state of the called terminal, and then terminates the current procedure.

Steps 309-310: The ADP selects an advertisement voice or a group of advertisement voices which is stored in the self-stored advertisement voice file by inquiring the advertisement voice identity (ID) according to the information of the calling number, the called number, the time interval, the data or the holidays, etc, returns an ACM to the calling terminal through the calling LS and plays the selected advertisement voice to the calling terminal;

The ADP can play the designated single voice group or voice according to the preset regulations of playing, or the ADP can play several voice groups or voices in rotation.

Step 311: The ADP stops playing advertisement voice upon receiving the answer signal of the called party or the call interrupt signal of the calling party.

In this way, after the ADP is added to the existing PSTN, if the calling party has subscribed to the advertisement service in the calling LS, the function of playing advertisement through ring back tone is implemented.

In Step 303, the calling LS routes the call to the ADP according to the ADP route code and triggers the advertisement service in the ADP. There is no MS between the calling LS and the ADP. In a practical application, there may be an MS between the calling LS and the ADP shown in FIG. 2b, and the MS is used to connect the calling LS with the ADP. Under such circumstances, the calling LS transmits the IAM to the ADP according the ADP route code via the MS so as to route the call to the ADP and triggers the advertisement service in the ADP. The technical scheme is similar to the above mentioned technical scheme, so there is no more description.

In the procedure shown in FIG. 3, the ADP plays a ring back tone which includes advertisement to the calling terminal when the called terminal is idle while transmitting a busy tone to the calling terminal transparently through the called LS when the called terminal is busy. The scheme of the present invention may also include playing a ring back tone which includes advertisement to the calling terminal when the called terminal is busy. Under such circumstances, the ADP transmits the ringing tone to the calling terminal transparently when the called terminal is idle while the ADP plays a ring back tone which includes an advertisement to the calling terminal when the called terminal is busy. It is understood that the scheme of the present invention may also include playing different advertisements when the called terminal is in different states, namely playing an advertisement when the called terminal is busy and playing another advertisement when the called terminal is idle.

In the procedure shown in FIG. 3, the ADP plays a ring back tone to the calling terminal after receiving the state of the called terminal returned by the called LS. The embodiment of the present invention further comprises: upon receiving a call from the calling terminal, the ADP routes the call to the called LS and plays a ring back tone which includes an advertisement to the calling terminal through the calling LS at the same time; upon receiving the state of the called terminal returned by the called LS, the ADP decides whether to play a ring back tone which includes an advertisement to the calling terminal via the calling LS or transmits the busy tone to the calling terminal transparently through the calling LS according to the state of the called terminal.

Figure 4:
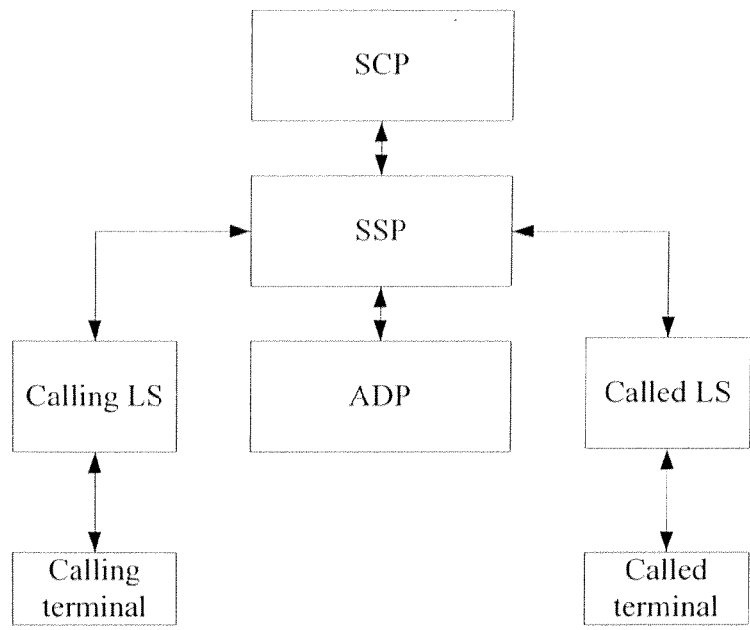
FIG. 4 is a schematic diagram illustrating the structure of a system for playing advertisement including the ADP of FIG. 1 in accordance with another embodiment of the present invention.

FIG. 4 is a schematic diagram of the structure of a system for playing advertisement in accordance with another embodiment of the present invention, where the ADP is added to an existing PSTN combined with IN. As shown in FIG. 4, in this embodiment, the system for playing advertisement includes a calling terminal, a calling LS, a called terminal, a called LS, a Service Switch Point (SSP) of IN, a Service Control Point (SCP) of IN and an ADP.

The calling terminal connects with the SSP through the calling LS and the called LS connects with the SSP through the called LS. The SSP connects with the SCP and the ADP respectively. Upon receiving a call initiated by the calling terminal to the called terminal, the calling LS routes the call to the SSP. The SSP triggers the advertisement service in the SCP, which returns the ADP route code to the SSP, and the SSP routes the call to the called LS. The called LS returns the state of the called terminal to the SSP. If the state of the called terminal is the preset advertisement playing state, the SSP instructs the ADP to play a ring back tone which includes an advertisement to the calling terminal via the calling LS.

In the network shown in FIG. 4, there is no alternative voice channel in the ADP. The functions of the ADP are playing advertisement and connecting the voice channel for playing advertisement with the MS voice channel.

As mentioned above, in order to implement the function of playing advertisement through a ring back tone, the user needs to subscribe to the advertisement service to become an advertisement service member in advance in the LS to which the user belongs.

Figure 5:
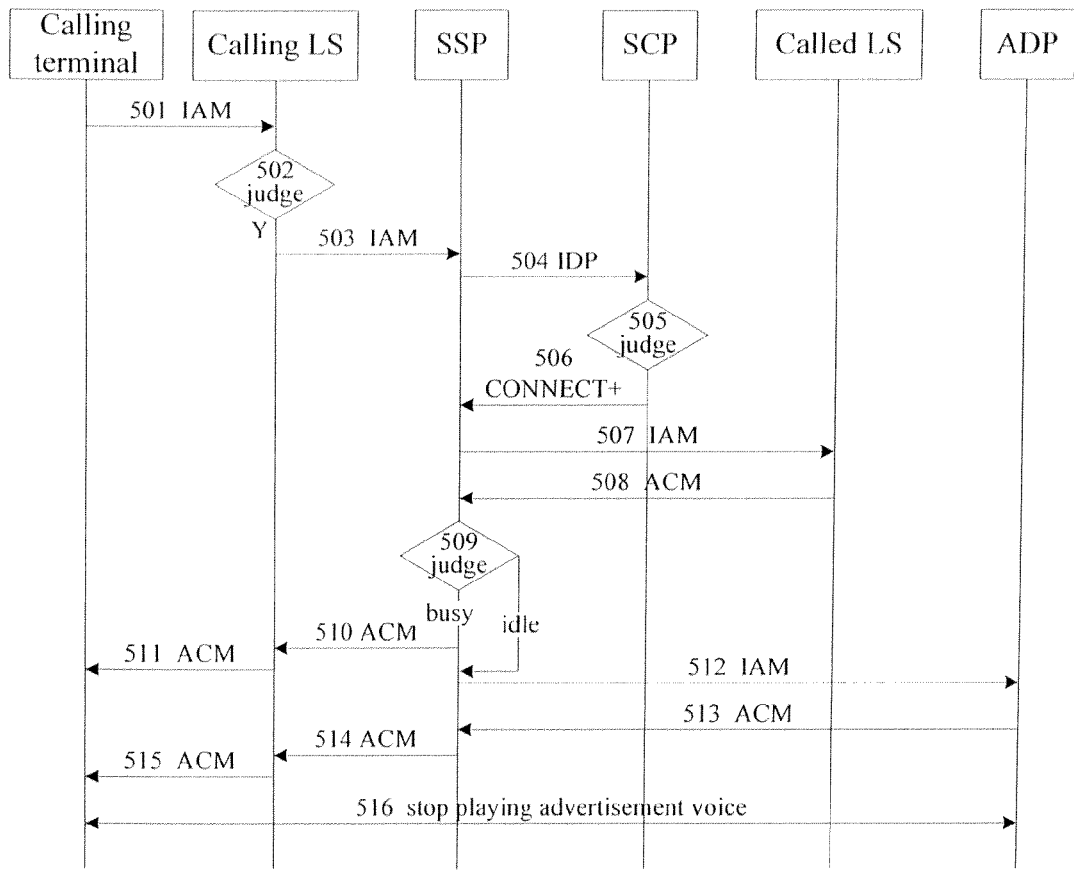
FIG. 5 is a flow chart illustrating advertisement playing by the system of FIG. 4.

FIG. 5 is the flow chart of playing advertisement based on the system shown in FIG. 4. In this embodiment, the calling party and the called party are fixed telephone users, and the calling party has subscribed to the advertisement service and become an advertisement service member in the calling LS. As shown in FIG. 5, this embodiment mainly comprises the steps of:

Step 501: The calling terminal initiates a call and sends an Initial Address Message (IAM) which at least includes a calling number and a called number to the calling LS.

Step 502: Upon receiving the IAM, the calling LS decides whether the calling number has the identity of advertisement service member, if so, the calling LS adds the ADP route code into the IAM and proceeds to Step 503 since the calling party is an advertisement service member; otherwise, performs a normal call routing procedure Step 503: The calling LS sends to the SSP, according to the intelligent service code, the TAM which at least includes the intelligent service code, the calling number and the called number.

Step 504: Upon receiving the TAM, the SSP sends an Initial Detective Point (IDP) message to the SCP and triggers the advertisement service in the SCP. The IDP at least includes an intelligent service code, a calling number and a called number.

Step 505: Upon receiving the IDP message, the SCP decides whether the service to which the calling party has subscribed is an advertisement service according to the intelligent service code and the relationship between intelligent service codes and service types. If so, proceed to Step 506; otherwise, perform a normal call routing procedure;

The relationship between intelligent service codes and service types is stored in the database of the SCP. Typically, one intelligent service code corresponds to one service type.

Step 506: The SCP separates the intelligent service code from the IDP message and returns the ADP route code to the SSP, namely returns to the SSP a CONNECT+ message that carries the calling number, the ADP route code and the called number.

Step 507: Upon receiving the CONNECT+ message, the SSP sends an IAM which at least includes the calling number and the called number to the called LS according the called number and routes the call to the called LS.

Step 508: The called LS, upon receiving the TAM, inquires the state of the called terminal according to the called number carried by the IAM, returns an Address Complete Message (ACM) which includes the state of the called terminal to the SSP, establishes a voice channel between the called LS and the SSP, selects a ring back tone corresponding to the state of the called terminal from all ring back tones stored in its voice memory and plays the selected ring back tone through the established voice channel;

The ring back tone is the voice which is selected by the called LS from its voice memory according to the state of the called terminal after obtaining the state of the called terminal according to the received called number. If the called terminal is busy, the returned ring back tone is a busy tone, and if the called terminal is idle, the ring back tone is the ringing tone which means waiting for an answer from the called party.

Step 509: The SSP, upon receiving the ACM, detects the state of the called terminal according to the ACM, and if the called terminal is busy, proceeds to Step 510; if the called terminal is idle, proceeds to Step 512.

Steps 510-511: The SSP returns an ACM to the calling terminal via the calling LS, transmits to the calling terminal transparently the busy tone returned by the called LS and corresponding to the state of the called terminal, and then terminates the current procedure.

Step 512: The SSP sends an IAM to the ADP according to the ADP route code and requests the ADP to play an advertisement voice. The IAM at least includes the calling number, the ADP route code and the called number.

Steps 513-515: The ADP selects an advertisement voice or a group of advertisement voices which is stored in a self-stored advertisement voice file by inquiring the ID for playing the advertisement voice according to the information of the calling number, the called number, the time interval, the data or the holidays, etc, returns an ACM to the calling terminal through the calling LS and plays the selected advertisement voice to the calling terminal;

The ADP can play the designated single voice group or voice according to the preset regulations of playing, or the ADP can play several voice groups or voices in rotation.

Step 516: the SSP stops playing the advertisement voice and removes the voice channel between the ADP and the calling terminal upon receiving the answer signal of the called party or call interrupt signal of the calling party.

In this way, after the ADP is added to the existing PSTN combined with IN, if the calling party has subscribed to the advertisement service in the calling LS, the function of playing advertisement through the ring back tone is implemented.

In this embodiment, upon receiving the CONNECT+ message, the SSP sends an IAM to the called LS according to the called number and then sends an IAM to the ADP according to the ADP route code and request the ADP to play an advertisement voice after detecting that the called terminal is idle. In a practical application, the SSP may first send the IAM to the ADP according to the ADP route code and request the ADP to play an advertisement voice after receiving the CONNECT+ message; after receiving the advertisement voice played by the ADP, the SSP sends the IAM to the called LS according the called number and detects the state of the called terminal; if the called terminal is busy, the SSP transmits the busy tone corresponding to the state of the called terminal to the calling terminal transparently and terminates the current procedure; if the called terminal is idle, the SSP forwards the advertisement voice played by the ADP to the calling terminal via the calling LS. Alternatively, the SSP may send the IAM according to the ADP route code to request the ADP to play an advertisement voice after receiving the CONNECT+ message, and at the same time send the IAM to the called LS according to the called number and detect the state of called terminal; if the called terminal is busy, the SSP transmits the busy tone corresponding to the state of the called terminal to the calling terminal transparently and then terminates the current procedure; if the called terminal is idle, the SSP plays the advertisement voice played by the ADP to the calling terminal through the calling LS. These two technical schemes are the same as the above mentioned technical scheme, so there is no more description.

In the above mentioned two embodiments of the present invention, the users are fixed telephone users, and the communication network is PSTN or PSTN combined with IN. In practical applications, users may be mobile telephone users, and the communication network may be mobile communication network or mobile communication network combined with IN. Under such circumstances, the state of the called terminal in Step 305 or Step 508 may be power-off or out-of-service as well. If the state of the called terminal is power-off or out-of-service, the ring back tone which is played by the called LS and corresponds to the state of the called terminal is the voice which informs that the called terminal is power-off or out-of-service. In this case, if the ADP in Step 306 or the SSP in Step 509 detects the state of the called terminal is power-off or out-of-service, it will return the ACM to the calling terminal via the calling LS, transmit to the calling terminal transparently the voice corresponding to the state of the called terminal to, inform that the called terminal is power-off or out-of-service, and then terminates the current procedure. Such a technical scheme is the same as the above mentioned two technical schemes, so there is no more description.

As can be seen from the above mentioned embodiments, the method for playing advertisement by using a ring back tone includes: adding an ADP to the existing communication network; upon receiving a call initiated by the calling party, deciding by the calling LS whether the calling party is an advertisement service member, if so, triggering directly or indirectly the ADP; if the called terminal is idle, selecting by the ADP an advertisement voice from its self-stored voices in the voice memory and playing the selected advertisement to the calling terminal through a ring back tone. In this way, the demand of businessmen for providing advertisement services using a communication network is satisfied, and the operator can gain more profits.

To the embodiments of the present invention, the service implementation cost is low because it is only needed to add the ADP to an existing communication network and there is no need to update or modify the devices or entities in the existing communication network. At the same time, the access number resource is saved and the service implementation cost is further reduced because there is no need to use an access number in accordance with the embodiments of the present invention.

In addition, since the advertisement is played through a ring back tone, what the user hears is a vivid advertisement other than monotone toot, which not only entertains the user but also promote the advertisements for the businessmen, thereby facilitating the extension and application of the service.

At the same time, since businessmen can upload or adjust advertisement voices through the ADP management interface provided by the operator and can set or modify the regulations of playing an advertisement voice, the ADP can play one designated advertisement voice group or single advertisement voice, or play several advertisement voice groups or several advertisement voices in rotation according to the information of different calling numbers, different called numbers, different time intervals, different data or different holidays, etc. The way of playing advertisement voice is very flexible, which also facilitates the extension and application of the service.

Although there have been applications of the ring-back-tone advertisement service, there is a great difference between the conventional ring-back-tone advertisement service and the embodiments of the present invention. In the conventional ring-back-tone advertisement service, whether the user has subscribed to the ring-back-tone advertisement service is decided according to the called number, so the ring-back-tone advertisement service depends on the called party. In the embodiments of the present invention, however, whether the user has subscribed to the ring-back-tone advertisement service is decided according to the calling number, so the ring-back-tone advertisement service depends on the calling party, and the advertisement voices configured for the calling party are played.

The foregoing is only preferred embodiments of the present invention and is not intended to limit the scope of the present invention. Any modification, equivalent substitution, or improvement made without departing from the spirit and principle of the present invention should be covered by the scope set forth in the appended claims.

The invention claimed is:
1. An apparatus, comprising:
a switch point;
a service logic supporting unit; and
a voice playing unit;
wherein
the switch point is configured to initiate an advertisement service call to the service logic supporting unit after receiving a call from a calling terminal which is routed from a calling local switch (LS) or a tandem switch (MS);
the service logic supporting unit is configured to receive the advertisement service call from the switch point, and return an advertisement service instruction to the switch point;
the switch point is further configured to, upon receiving the advertisement service instruction returned from the service logic supporting unit, instruct the voice playing unit to play a ring back tone which includes an advertisement according to the advertisement service instruction; and establish a voice channel for the voice playing unit to play the advertisement;
the voice playing unit is configured to play the ring back tone which includes the advertisement according to the advertisement service instruction to the calling terminal; and wherein
the service logic supporting unit comprises a Front End Processor (FEP), a Computer Telephone Integrated Server (CTI Server), and at least one User Interaction Script Server (UIScript Server);
the FEP is configured to exchange signals between the switch point and the voice playing unit and to exchange the signals between the switch point and the CTI Server;
the CTI Server is configured to receive the advertisement service call which is sent from the switch point via the FEP, and send the advertisement service call to a corresponding UIScript Server according to the properties of the advertisement service call and return the advertisement service instructions returned by the UIScript Server to the switch point through the FEP; and
the UIScript Server is configured to implement a corresponding service logic script according to the properties of the advertisement service call forwarded by the CTI Server, and return the advertisement service instructions to the CTI Server.

2. The apparatus according to claim 1, wherein the service logic supporting unit further comprises a Database Access Proxy Server (DB Access Proxy Server); and wherein
the UIScript Server is configured to request the DB Access Proxy Server for advertisement code data according to requirement of the service logic script when implementing the service logic script;
and the DB Access Proxy Server is configured to, upon receiving the request from the UIScript Server, return the advertisement code data to the UIScript Server.

3. A method for an Advertisement Platform apparatus to play an advertisement to a calling terminal, the apparatus comprises a switch point, a service logic supporting unit and a voice playing unit, the method comprising:
sending, by the switch point, an advertise service call to the service logic supporting unit upon receiving a call from the calling terminal, which is routed from a calling local switch (LS) or a tandem switch (MS);
returning, by the service logic supporting unit, an advertisement service instruction to the switch point after receiving advertisement service call from the switch point;
instructing, by the switch point, the voice playing unit to play a ring back tone which includes an advertisement according to the advertisement service instruction; and
establishing, by the switch point, a voice channel to the calling LS or MS for the voice playing unit to play the advertisement; and
playing, by the voice playing unit, the advertisement according to the advertisement service instruction to the calling terminal;
wherein the service logic supporting unit comprises a Front End Processor (FEP), a Computer Telephone Integrated Server (CTI Server), and at least one User Interaction Script Server (UIScript Server); and returning the advertisement instruction comprises:
receiving, by the CTI Server through the FEP, the advertisement service call, and sending the advertisement service call to a corresponding UIScript Server according to the properties of the advertisement service call;
implementing, by the UIScript Server, a corresponding service logic script according to the properties of the advertisement service call forwarded by the CTI Server, and returning the advertisement service instructions to the CTI Server; and
sending, by the CTI Server, the advertisement service instructions to the switch point through the FEP.

4. A system for playing an advertisement, comprising:
a calling local switch (LS),
a called LS,
a Service Control Point (SCP) of an Intelligent Network (IN),
a Service Switch Point (SSP) of the IN; and
an advertisement playing apparatus;
wherein
the calling LS is configured to receive a call from a calling terminal to a called terminal and route the call to the SSP;
the SSP is configured to initiate an advertisement service in the SCP upon receiving the call;
the SCP is configured to return route code of the advertisement playing apparatus to the SSP;
the SSP is further configured to route the call to the called LS;
the called LS is configured to return the state of the called terminal to the SSP;
the SSP is further configured to instruct the advertisement playing apparatus to play a ring back tone which includes an advertisement voice via the SSP and the calling LS in turn.

5. The system according to claim 4, wherein the advertisement playing apparatus comprises:
a switch point;
a service logic supporting unit; and
a voice playing unit;
wherein
the switch point is configured to initiate an advertisement service call to the service logic supporting unit after receiving a call from a calling terminal which is routed from a calling local switch (LS) or a tandem switch (MS);
the service logic supporting unit is configured to receive the advertisement service call from the switch point, and return an advertisement service instruction to the switch point;
the switch point is further configured to, upon receiving the advertisement service instruction returned from the service logic supporting unit, instruct the voice playing unit to play a ring back tone which includes an advertisement according to the advertisement service instruction; and establish a voice channel for the voice playing unit to play the advertisement;
the voice playing unit is configured to play the ring back tone which includes the advertisement according to the advertisement service instruction to the calling terminal.

6. A method for playing an advertisement, comprising:
receiving, by a calling switch (LS), a call from a calling terminal to a called terminal and routing the call to a Service Switch Point (SSP);
initiating, by the SSP, an advertisement service in a Service Control Point (SCP);
returning, by the SCP, an Advertisement Platform (ADP) route code to the SSP;
routing the call to a called LS, and returning to the SSP a state of the called terminal by the called LS;
playing a ring back tone which includes an advertisement to the calling terminal by the SSP if the state of called terminal is a preset advertisement playing state.

7. The method according claim 6, further comprising:
upon receiving the call from the calling terminal, deciding by the calling LS whether calling number has an identity of an advertisement service member, and if yes, routing the call to the SSP after placing an intelligent service code in the call; otherwise, performing a normal call routing procedure.

8. The method according to claim 6, wherein routing the call to the SSP by the calling LS and triggering the advertisement service in the SCP by the SSP comprises:
sending an Initial Address Message (IAM) which carries an intelligent service code to the SSP by the calling LS; upon receiving the IAM by the SSP, sending an Initial Detective Point (IDP) message which carries the intelligent service code to the SCP.

9. The method according to claim 8, wherein returning the ADP route code to the SSP by the SCP comprises:
deciding by the SCP whether the calling party has subscribed to the advertisement service according to the intelligent service code and relationship between the intelligent service code and service type, and if yes, sending a CONNECT+ message which includes the ADP route code to the SSP.

10. The method according to claim 6, wherein routing the call to the called LS and receiving the state of the called terminal by the SSP comprises:
sending by the SSP an Initial Address Message (IAM) to the called LS according to called number;
upon receiving the IAM by the called LS, inquiring the state of the called terminal according to called number carried by the IAM and returning an Address Complete Message (ACM) which carries the state of the called terminal to the SSP; and
establishing a voice channel between the called LS and the SSP and returning to the SSP through the established voice channel the ring back tone which is stored in voice memory and corresponds to the state of the called terminal.

11. The method according to claim 6, wherein the called terminal has an idle state and a busy state, and the preset advertisement playing state is the idle state; and
instructing the ADP to play the ring back tone which includes the advertisement by the SSP if the state of the called terminal is the preset advertisement playing state comprises:
if the state of the called terminal is busy, returning, by the SSP, an ACM to the calling terminal via the calling LS and transmitting the busy tone returned by the called LS and corresponding to the state of the called terminal to the calling terminal transparently; and
if the state of the called terminal is idle, instructing the ADP by the SSP to play to the calling terminal the ring back tone which includes advertisement.

12. The method according to claim 6, wherein the called terminal has an idle state and a busy state, and the preset advertisement state is the idle state; and
instructing the ADP by the SSP to play the ring back tone which includes the advertisement if the state of the called terminal is the preset advertisement playing state comprises:
instructing the ADP by the SSP to play to the calling terminal the ring back tone which includes advertisement if the state of the called terminal is idle;
upon receiving the state of the called terminal by the SSP, transmitting the busy tone corresponding to the state of the called terminal to the calling terminal if the state of the called terminal is busy.

13. The method according to claim 6, wherein playing the ring back tone which includes the advertisement to the calling terminal by the ADP comprises:
selecting by the ADP one self-stored advertisement voice group or single advertisement voice according to the information of calling number, called number, time interval, date or holiday; and
playing the selected advertisement voice for the calling terminal via the calling LS by returning an Address Complete Message (ACM) to the calling terminal via the SSP and the calling LS in turn.

14. The method according to claim 6, further comprising:
upon receiving an answer signal from the called terminal or a call interruption signal from the calling terminal by the SSP, stopping playing the ring back tone which includes the advertisement.

15. A method for playing an advertisement, comprising:
receiving, by an advertisement playing apparatus, a call from a calling terminal which is routed from a calling local switch (LS);
sending, by the advertisement playing apparatus, an Initial Address Message (IAM) to the called LS according to called number;
upon receiving the IAM, inquiring, by the called LS, the state of the called terminal according to the called number which is carried by the IAM;
returning, by the called LS, to the advertisement playing apparatus an Address Complete Message (ACM) which carries the state of the called terminal;
establishing, by the advertisement playing apparatus, a voice channel for playing the ring back tone between the called LS and the advertisement playing apparatus; and
selecting, by the advertisement playing apparatus, one self-stored advertisement voice group or single advertisement voice according to information of calling number, called number, time interval, date or holiday;
playing, by the advertisement playing apparatus, the selected advertisement voice group or single advertisement voice to the calling terminal.

16. An apparatus for playing an advertisement, comprising:
a switch point;
a service logic supporting unit; and
a voice playing unit;
wherein the switch point is configured to initiate an advertisement service call to the service logic supporting unit after receiving a call from a calling terminal which is routed from a calling local switch (LS) or a tandem switch (MS);
the service logic supporting unit is configured to receive the advertisement service call from the switch point, and return an advertisement service instruction to the switch point;
the switch point is further configured to, upon receiving the advertisement service instruction returned from the service logic supporting unit, instruct the voice playing unit to play a ring back tone which includes an advertisement according to the advertisement service instruction; and establish a voice channel for the voice playing unit to play the advertisement;
the service logic supporting unit is further configured to obtain advertisement voice group or single advertisement voice according to information of calling number, called number, time interval, date or holiday;
the voice playing unit is configured to play selected advertisement voice group or single advertisement voice to the calling terminal.

17. The apparatus according to claim 16, further comprising an advertisement management unit configured to provide an interface for managing, maintaining and setting the advertisement services, storing uploaded advertisement voice files in the voice playing unit, storing identities of uploaded advertisement voice files as advertisement code data in itself and storing preset regulations for playing advertisement voice;
wherein the regulations of playing advertisement voice comprise playing the advertisement according to the information of different calling numbers, different called numbers, different time intervals, different data or different holidays, or playing one designated advertisement voice group or single advertisement voice, or playing several advertisement voice groups or several advertisement voices in rotation.

18. The apparatus according to claim 17, wherein the advertisement management unit further comprises an ADP Server and a Database Server;
wherein the ADP Server is configured to implement the management and maintenance of the advertisement services, provide the interface for managing and maintaining the advertisement services and an interface for setting or modifying the regulations for playing advertisement voices, and store the uploaded advertisement voice files in the voice playing unit;
the Database Server is configured to store the identities of the uploaded advertisement voice files as the advertisement code data in itself and store the regulations for playing the advertisement voice.

* * * * *